(No Model.)

W. McKENZIE.
THRASHING MACHINE.

No. 557,691. Patented Apr. 7, 1896.

Witnesses
Jno. G. Hinkel
E. Garnett Ellis

William McKenzie
Inventor
By
Foster Freeman
Attorneys

UNITED STATES PATENT OFFICE.

WILLIAM McKENZIE, OF DUBLIN, IRELAND.

THRASHING-MACHINE.

SPECIFICATION forming part of Letters Patent No. 557,691, dated April 7, 1896.

Application filed July 27, 1895. Serial No. 557,377. (No model.) Patented in England June 22, 1894, No. 12,096.

*To all whom it may concern:*

Be it known that I, WILLIAM McKENZIE, merchant, a subject of the Queen of Great Britain, residing at 212 Great Brunswick Street, in the city and county of Dublin, Ireland, have invented certain new and useful Improvements in or Connected with Thrashing-Machines, (for which I have obtained a patent in Great Britain, No. 12,096, dated June 22, 1894,) of which the following is a specification.

The invention relates to improvements in or connected with thrashing-machines.

In thrashing-machines as ordinarily constructed the ears and straw in the sheaf are fed into the machine, thus necessitating the employment of shaking and trussing machinery.

Now the object of the present invention is to combine with the feed-drum a simple device, by the aid of which the ears will be severed from the sheaves and passed into the machine, leaving the straw in sheaf upon the feeding-platform, thereby dispensing with the shaking and trussing machinery hitherto employed. For this purpose I fix upon one end of the feed-drum or upon its shaft a circular saw, or it might be a band-saw, band-knife, or other cutting device, against which the sheaves may be fed by hand or by passing between a pair of endless bands or by other suitable mechanism. The heads will be severed from the sheaf and will drop into the machine, while the straw still in the sheaf can be removed by any suitable means.

By combining the saw or cutting device with the drum in the manner hereinbefore described a very simple and inexpensive machine is obtained and a considerable economy of power and space effected.

The better to explain my meaning reference is made to the accompanying drawings, in which—

Figure 1:
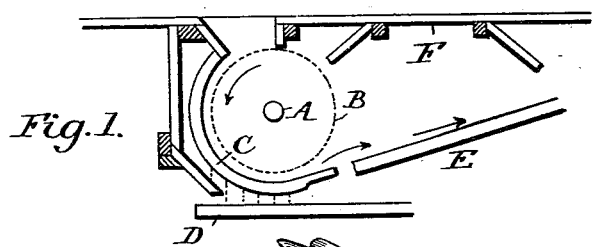
Figure 2:
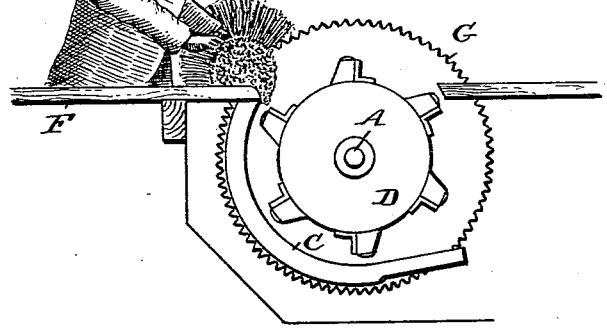
Figure 3:
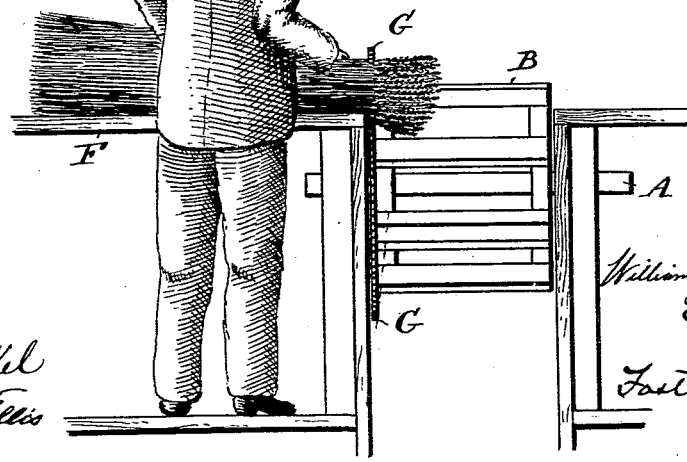

Figure 1 is a section showing a portion of the usual arrangement of a thrashing-machine. Fig. 2 is a section, enlarged, showing the cutting arrangement. Fig. 3 is a cross-section of the same.

Similar letters in each refer to similar parts.

In Fig. 1, A is the axle of the beating-cylinder B. (Shown dotted.)

C is the concave.

D is the shaking-shoe.

E is the straw-elevator, and F is the feed-board.

The grain falls, as shown in dotted lines, onto D, and the straw follows the direction of the arrows adjacent.

In my arrangement instead of treating (as in such a machine) the whole sheaf I use in conjunction with the drum or cylinder a saw, as shown in Figs 2 and 3, whereby the ears are severed and alone are treated, allowing a great deduction to be made in the size of the machine.

For clearness and simplicity a common type of saw is illustrated; but obviously a different type of teeth may be used or knives may replace the teeth. In the drawings the common form of longitudinal slats are illustrated on the beating-cylinder; but obviously teeth or other approved modification in this part of the machine may be used without affecting the spirit of my invention.

The machine is provided with a feed-table arranged at right angles to the direction of feed of the ears to the thrashing-cylinder, and the cutting device for severing the ears from the stems is arranged at that side of the machine immediately adjacent to the inner end of said feed-table, so that as the sheaves are fed along the table to the proper point the ears will be severed and caused to drop between the thrashing-cylinder and the case. In this way it will be seen that the stems are not obliged to be placed within the machine, as is the case with other machines of this kind heretofore devised; but on the contrary these stems are cast away and the thrashing operation is proceeded with in the ordinary manner.

Having now particularly described and ascertained the nature of my said invention and in what manner the same is to be performed, I declare that what I claim is—

In a thrashing-machine, the combination of a feed-table arranged at right angles to the direction of feed of the ears to the thrashing-cylinder, and a cutting device for severing the ears from the stems, arranged at a point immediately adjacent to the inner end of the feed-table, substantially as shown and for the purpose set forth.

Signed at Dublin this 3d day of April, 1895.

WILLIAM McKENZIE.

Witnesses:
ROBT. LAWLOR,
MORGAN C. JAMESON.